April 11, 1950 W. P. MASON 2,503,831

FINE WIRE DELAY LINE

Filed Jan. 7, 1949

INVENTOR
W. P. MASON
BY H. A. Burgess
ATTORNEY

Patented Apr. 11, 1950

2,503,831

UNITED STATES PATENT OFFICE 2,503,831

FINE WIRE DELAY LINE

Warren P. Mason, West Orange, N. J., assignor to Bell Telephone Laboratories, Incorporated, New York, N. Y., a corporation of New York Application January 7, 1949, Serial No. 69,759

8 Claims. (Cl. 178—44)

This invention relates to delay circuits for electrical currents and particularly to a mechanical delay line using a fine wire as the transmission medium.

It is an object of the invention to provide a simple, compact, light weight, delay line which is inexpensive in construction and is adapted to withstand rough handling.

In accordance with the form of this invention specifically disclosed herein electrical impulses to be delayed are impressed on a piezoelectric crystal or an electrostrictive substance curved to focus the resulting mechanical vibrations on the head of a fine wire. The head of the wire is curved so that the mechanical waves impressed thereon are converted into planar waves in the wire, which are then transmitted therealong to the output end. The opposite end of the wire is so formed as to radiate uniformly toward an output crystal having a curvature similar to that of the input crystal and disposed with its focal point at the output end of the wire. By "fine wire" is meant a wire the diameter of which is not over one-fourth the wavelength of the mechanical vibrations to be delayed. By keeping the diameter equal to or less than this value, transmission through the wire of planar waves resulting from the impression of the mechanical impulses upon the rounded wire end is governed by Young's modulus, and as a result the wire does not have to be straight, but may be curved in any desired manner as, for example, by winding it into a relatively small coil, without interference with the transmission characteristics. Any length of wire necessary to provide the desired delay, while not exceeding the permissible attenuation, may be incorporated into such a coil of small diameter.

The invention has application to various fields of use. One example is in certain types of radars or echo ranging in which echoes as received are compared with later received echoes, by artificially delaying the former after their receipt. In certain military uses of such echo ranging systems portability and the ability to withstand rough handling are requisite. The delay line of the invention is well suited to this use because of its light weight and ruggedness.

Various types of line construction have been tried, using a liquid such as mercury encased in glass or metal tubes. In order to provide the requisite delay length it has been necessary to use folded lines to keep the physical dimensions of the system within usable bounds. The manufacture of folded lines was extremely expensive, since very precise work was required, while the lines themselves were so heavy and cumbersome as to interfere with portability. Such mercury lines were very subject to breakage. To avoid the breakage and leakage of liquid lines, the use of folded solid lines was proposed, but such lines suffered from internal reflections and other difficulties which militated against their production in lengths adequate to produce the desired delay periods.

Another example of the uses to which this invention may be put is found in those telephone circuits where a narrow band delay line is desired, for which it provides a simple and inexpensive construction.

The present invention utilizes a solid wire delay line which is substantially free from problems of internal reflections and diffractions. By limiting the diameter of the wire to one-fourth of the wavelength of the transmitted impulses or less, the wire may be bent without causing internal reflections. As indicated above, the transmission is then controlled by Young's modulus. In a particular embodiment, it has been possible to set up a 2,500-microsecond delay line, using 42 feet of fine aluminum wire coiled within a 2-inch tube, with substantial advantages not only in size but in weight and ruggedness. Aluminum, magnesium, and fused quartz are examples of the materials which may be successfully used as the fine wire. Aluminum has been found to have a Q value of about 10,000, which as in all metals is nearly independent of frequency. Fused quartz has a Q of 50,000, and magnesium a Q of 100,000.

The attenuation A in nepers of a delay line of the type described above is given by the expression $$A=\frac{2\pi DF}{2Q} \qquad (1)$$

where D is the delay in seconds, F is the frequency in cycles per second, and Q is the quality factor mentioned above. For example, if the required delay D is 2,500 microseconds, the frequency F is 5 megacycles, and Q is 10,000, the attenuation will be $$A=\frac{2\pi 2{,}500\times 10^{-6}\times 5\times 10^{6}}{2\times 10{,}000}=3.93 \text{ radians} \qquad (2)$$

or 34 decibels. This attenuation is of substantially the same order as that which would be found in a mercury line producing an equivalent time delay.

The invention may be better understood by reference to the drawings in which.

Figure 1:
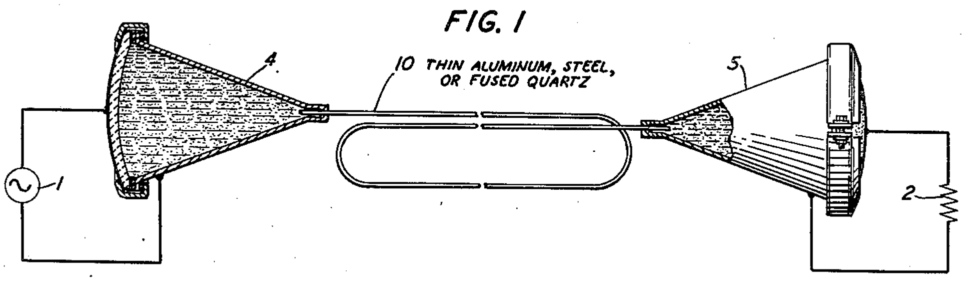
Fig. 1 is a schematic diagram, partially in section, of the delay system embodying the invention.
Figure 2:
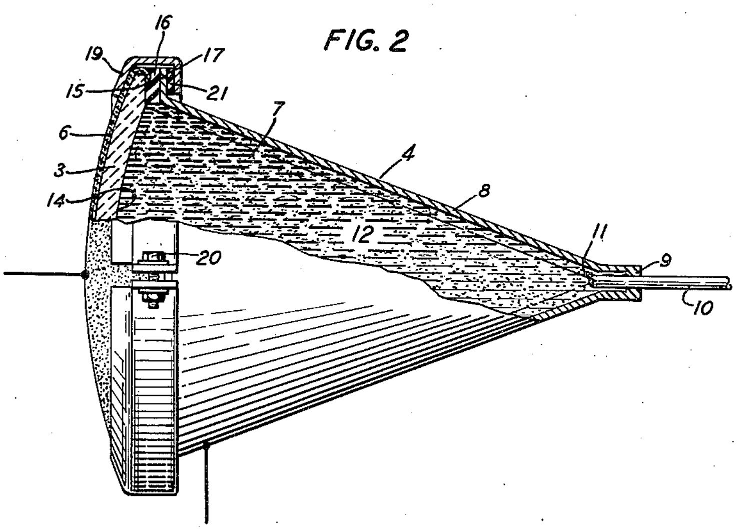
Fig. 2 is a detail view of the structure of one of the head assemblies.
Figure 3:
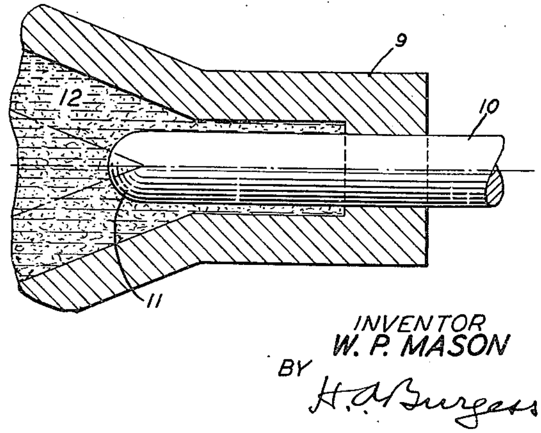
Fig. 3 is an enlarged detail view showing the construction of the end of the detailed line and its juncture with the head assembly.

Referring now to Fig. 1 of the drawings, I have shown an input signal to be delayed as being supplied by an alternating source 1, and the delayed output as being fed into a work circuit represented by a conventional resistance 2. The input head assembly 4 and the output head assembly 5 are of substantially identical construction and will be described by reference to Fig. 2, where the input head assembly 4 is shown in enlarged form, with the curvilinear crystal 3 and its face plating 6 exaggerated in thickness in relation to the other elements in the figure for clarity. Crystal 3 is a portion of a spherical shell, that is, it is of uniform thickness and curvature throughout the major portion thereof. Suitable means for sealing it within the head assembly 4 will be described in detail hereinafter.

The focusing chamber 7 of head assembly 4 is enclosed by crystal 3 and a conical container 8, which may be of metal or other material not affected by mercury. Its smaller end 9 is sealed about the input end of the delay line 10 so that the end of the wire projects into the conical area. The end 11 of the wire is spherically rounded, and its center of curvature fixed at the focus of crystal 3, so that all of the impulses impressed thereon will be converted into planar waves as they pass along the wire 10. Between the spherically curved head 11 of the wire and the concave side of the crystal 3, the focusing chamber 7 is completely filled by the transmitting medium 12, which in this case is preferably mercury.

Electrical contact to crystal 3 is obtained through the exposed plating 6, and to the inner face 14 through the mercury 12. In order to obtain a mercury-tight seal about the periphery of the crystal, the exposed plating 6 may be continued around the outer edge and onto the inner face for a short distance, as shown at 15. This short-circuits the crystal at its outer edge, so that practically no motion occurs there, and an adequate seal may be obtained by constraining an annular gasket 16 against the flanged end 17 of container 8. The constraint may be applied by means of an annular locking ring 19 of channelled cross-section, which is held by a conventional bolt 20. Ring 19 may be mounted by means of a conventional bracket, not shown.

Locking ring 19 is insulated from container 8 by means such as a gasket 21. Other equivalent methods of constructing an adequate seal about crystal 3 are known to those skilled in the art, and are deemed equivalent to that shown here.

The conical shape of container 8 minimizes the amount of mercury required. Since it extends parallel to the path of the focused mechanical waves, it also tends to minimize diffraction effects, and thus avoids changing the shape of the delayed pulse.

After passage through the line 10, the delayed mechanical pulse is converted back into electrical form in the output head assembly 5 by a process exactly the reverse of that in input head 4. The hemispherically rounded wire end 11 then acts to convert planar waves from line 10 into a conical beam which will fall on the corresponding crystal 3, and produce electrical impulses in the work circuit represented by the resistance 2.

The invention as described includes any equivalent shapes of crystals for focusing the mechanical waves, and such variations in structure as may be desirable with other methods of forming a seal suitable for the transmission medium used. The use of electrostrictive materials such as barium titanate, as well as those having piezoelectric characteristics, is deemed to be included within the scope of the appended claims, including such changes in the circuits and supporting structure as would be suitable for such embodiments.

What is claimed is:

1. In a delay circuit, the combination of a wire having a diameter not greater than one-fourth the wavelength of mechanical vibrations to be transmitted therethrough, and having a length such that the time required for passage of mechanical vibrations therethrough is substantially equal to the desired delay period; and input and output head assemblies associated with opposite ends of said wire, each of said assemblies comprising a head formed of material from the class including electrostrictive substances and piezoelectric crystals focused on an end of said wire, an end surface formed on said wire shaped to convert mechanical vibrations incident thereon into planar waves in said wire, an enclosed medium for transmitting mechanical impulses disposed between and in contact with said end surface and said head, and means for making electrical connections to said head.

2. In a delay circuit, the combination of a wire having hemispherically rounded opposite ends and a diameter not greater than one-fourth the wavelength of vibrations to be transmitted therethrough, and having a length such that transmission time therethrough of such vibrations is substantially equal to the desired delay period; input and output head assemblies connected to said opposite ends, each of said assemblies comprising a spherically curved piezoelectric crystal positioned with its center of curvature at the same point as that of one of said hemispherically rounded ends, an enclosure extending between said wire end and crystal, and a medium for transmitting mechanical impulses disposed within said enclosure and in contact with said wire end and said crystal; and means for making electrical connections to said head assemblies.

3. In a delay circuit, means for transforming electrical impulses into mechanical vibrations and for focusing said mechanical vibrations, a wire of length suitable to provide a required delay and having a diameter not greater than one-fourth the wavelength of said vibrations, a spherically curved input end formed on said wire and disposed at the point of focus of said mechanical vibrations, a transmission medium disposed between said means for focusing and said curved input end, a spherically curved output end formed on said wire opposite said input end, means for converting mechanical vibrations into electrical impulses disposed substantially concentrically with said output end, a transmission medium disposed between said output end and said means for converting mechanical vibrations into electrical impulses, means for applying electrical impulses to be delayed to said means for transforming said impulses into mechanical vibrations, and output connections associated with said means for converting mechanical vibrations into electrical impulses.

4. In a delay circuit, the combination of means for transmitting mechanical vibrations, comprising a wire of diameter not greater than one-fourth the wavelength of said vibrations and of length sufficient to introduce the desired delay time for passage of said vibrations therealong, a spherically curved surface forming an input end on said wire, a spherically curved surface forming an output end on said wire opposite to said input end; an input head assembly, comprising a spherically curved piezoelectric input crystal having a convex and a concave face, a medium for transmitting vibrations from the said concave face to the input end of said wire; and an output head assembly comprising a spherically curved piezoelectric output crystal having a convex and a concave face, and a medium for transmitting vibrations from the output end of said wire to the concave face of said output crystal.

5. In a delay circuit, the combination of means for transmitting mechanical waves comprising a wire of diameter not greater than one-fourth the wavelength of said mechanical waves and hemispherical end portions formed on said wire, means for impressing mechanical waves on said wire comprising a concave spherically curved piezoelectric crystal, a transmitting medium disposed in contact with said crystal and with one of said end portions, and means for confining said transmitting medium between said crystal and said one end portion, and means for utilizing said mechanical waves comprising a second spherical crystal having the concave side thereof directed toward the other of said end portions, a transmitting medium in contact with said second crystal and said other end portion, and means for confining said last-mentioned transmitting medium.

6. A delay circuit, comprising piezoelectric means for transforming electrical vibrations into compressional waves, means for focusing said compressional waves; a wire having a diameter no greater than one-quarter of the wavelength of said compressional waves to be delayed, a hemispherically rounded end formed on the input end of said wire and positioned to have compressional waves focused thereon; a reducingly tapered mercury chamber extending between said piezoelectric means and said rounded end, an expandingly tapered mercury chamber associated with the output end of said wire, focused piezoelectric means associated with said expandingly tapered mercury chamber, and a rounded radiating surface formed on said output wire end and disposed at the focus of said piezoelectric means.

7. In a delay circuit, the combination of means for transmitting mechanical vibrations, comprising a wire, of diameter not greater than one-fourth of the wavelength of said vibrations and a length adequate to require substantially the desired time delay period for the passage of said vibrations therealong, and having spherically curved input and output ends; an input head assembly fitted onto the input end of said wire and comprising a spherically curved concave piezoelectric input crystal, a transmitting medium for mechanical vibrations disposed in contact with the said input crystal, and enclosed by means fixing the input end of said wire at the focus of said crystal; an output head assembly fitted onto the output end of said wire and comprising a concave spherically curved piezoelectric output crystal fixed with its center of curvature identical with that of the output end of said wire, and a transmitting medium for mechanical vibrations disposed between said output end and said output crystal.

8. In a delay circuit, the combination of means for transmitting mechanical vibrations, comprising a wire of such diameter in relation to the wavelength of vibrations to be transmitted therethrough that transmission thereof is controlled by Young's modulus, rounded input and output ends formed on said wire, an input head assembly associated with said input end and comprising a curvilinear input head formed of material selected from the class including electrostrictive substances and piezoelectric crystals focused on said input end, a transmitting medium for mechanical vibrations disposed between said input end and said head and constrained to provide reflectionless transmission therebetween, and electrical connections adapted to impress an electrical impulse to be delayed across opposite faces of said input head; and an output head assembly associated with said output end and comprising a curvilinear output head formed of material selected from the class including electrostrictive and piezoelectric substances and having its focal center in said output end, a transmitting medium for mechanical vibrations so constrained between said output end and said output head as to provide transmission therebetween substantially without reflection, and electrical output connections to opposite faces of said output head.

WARREN P. MASON.

No references cited.